United States Patent

Hestad et al.

[15] 3,692,951

[45] Sept. 19, 1972

[54] TOLL RESTRICTOR CIRCUIT

[72] Inventors: Alfred M. Hestad, Chicago, Ill.; Max A. Bouknecht, Boca Raton, Fla.

[73] Assignee: International Telephone and Telegraph Corporation, New York, N.Y.

[22] Filed: June 5, 1970

[21] Appl. No.: 43,890

[52] U.S. Cl. .......................... 179/27 CB, 179/18 DA

[51] Int. Cl. .......................... H04m 3/38

[58] Field of Search ....... 179/18 DA, 27 CB, 16 EC, 179/18 D

[56] References Cited

UNITED STATES PATENTS

| | | | |
|---|---|---|---|
| 3,584,155 | 6/1971 | Koster | 179/18 D |
| 3,555,198 | 1/1971 | Stepan et al. | 179/18 D |
| 3,553,382 | 1/1971 | Knox et al. | 179/18 DA |
| 3,453,391 | 7/1969 | Hubbell | 179/16 EC |
| 3,350,507 | 10/1967 | Willrett et al. | 179/18 DA |

*Primary Examiner*—Kathleen H. Claffy
*Assistant Examiner*—Thomas W. Brown
*Attorney*—C. Cornell Remsen, Jr., Walter J. Baum, Paul W. Hemminger, Charles L. Johnson, Jr., Delbert P. Warner and Marvin M. Chaban

[57] ABSTRACT

Logic circuits which function as toll restrictors are disclosed for use in an Electronic PABX. These circuits are responsive to a dialed code demanding that a particular connection be made. The circuits include means responsive to either dial pulses or multifrequency signals to generate a coded signal of use in further processing. The circuits determine from the coded signal whether the particular caller is entitled to that service and provide a signal indicating whether a connection is authorized or not.

11 Claims, 4 Drawing Figures

INVENTORS
ALFRED M. HESTAD
MAX A. BOUKNECHT
BY
Delbert B. Warner
ATTORNEY

TOLL RESTRICTOR CIRCUIT

The present invention relates to toll restriction and in particular to the detection of unauthorized trunk calls in an electronic PABX and to means for preventing a connection when a restricted code is dialed.

In an automatic electronic telephone exchange, it is necessary to discriminate automatically between subscribers who are entitled to different classes of service. It is necessary particularly to distinguish between authorized trunk calls and unauthorized attempts to make trunk calls. It is necessary also to control trunk circuits in such a way as to prevent the completion of unauthorized connections.

Accordingly, it is an object of the present invention to provide means for determining whether particular attempts to make calls are authorized and for providing signals of use in preventing the completion of unauthorized calls while enabling authorized calls to be made.

In order to accomplish the foregoing objects and others ancillary thereto, the toll restrictor for an electronic PABX according to the present invention is provided with a connection to a trunk and trunk features circuit. When an access code signal is received, which indicates an attempt is being made to seize a trunk, the toll restrictor circuit is accessed. Dial pulses forming the code signal are then accepted by the restrictor. These pulses are processed through logic circuit means and the results are used as criteria in pre-wired circuits to determine whether the call may be completed. If the call may be completed, completion is allowed, if not the call is terminated and the restrictor is released.

Figure 4:
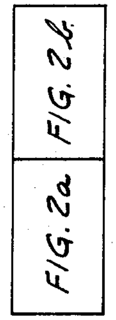
Figure 1:
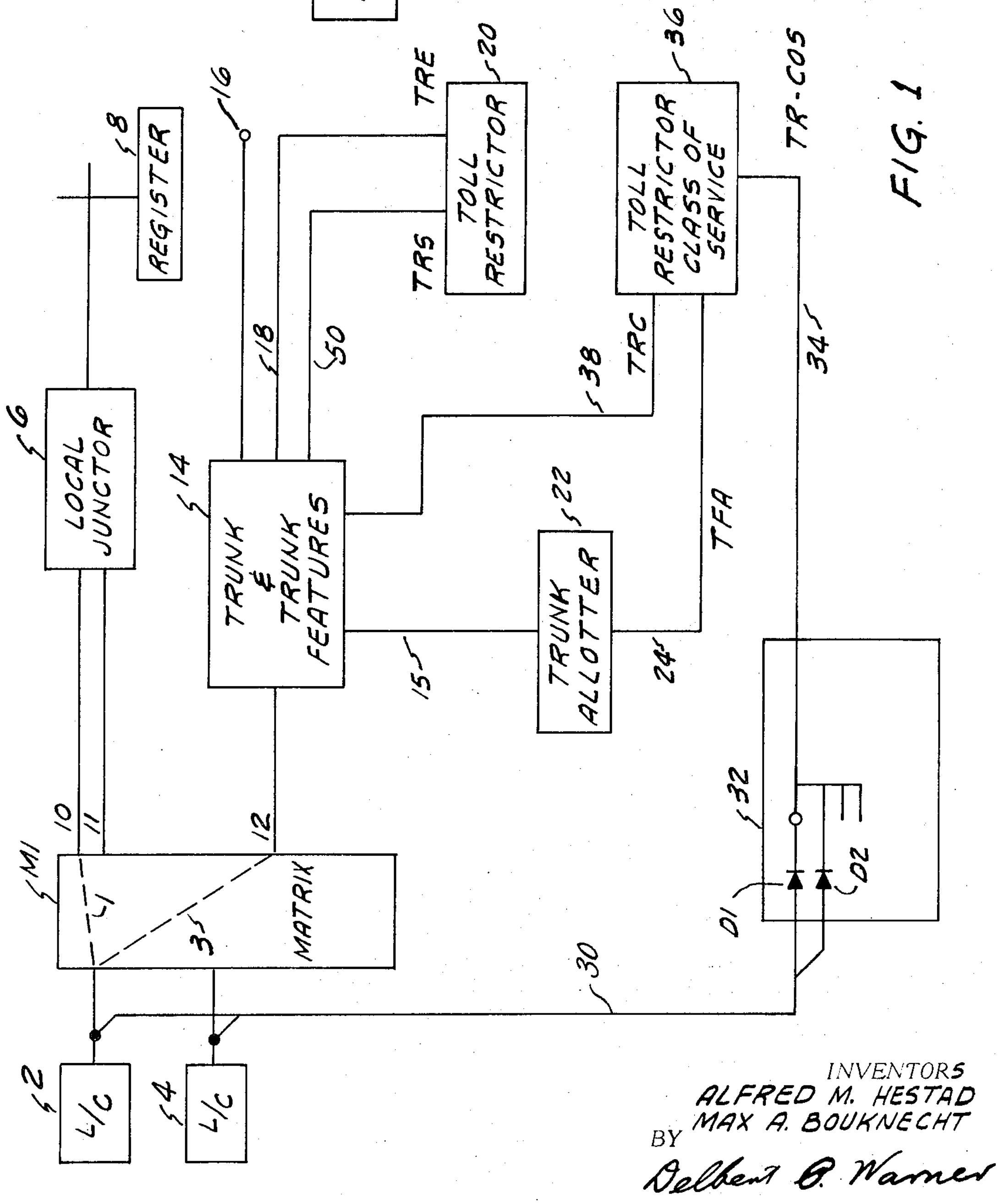
Figure 2A:
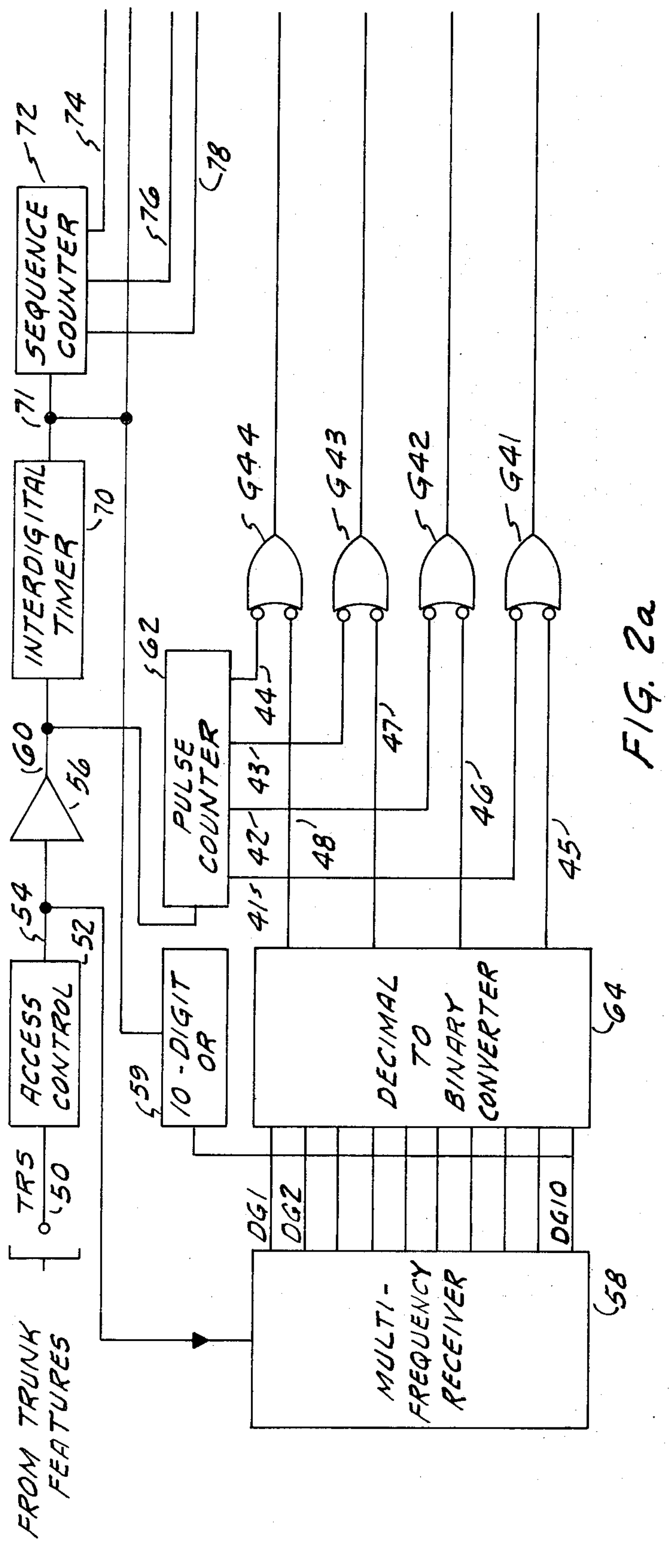
Figure 3:
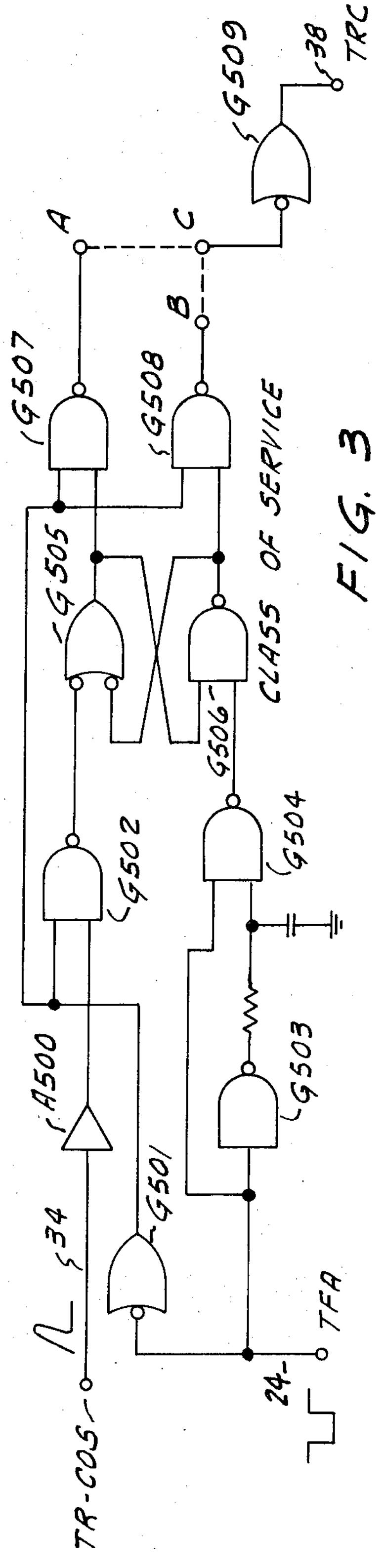
Figure 2B:
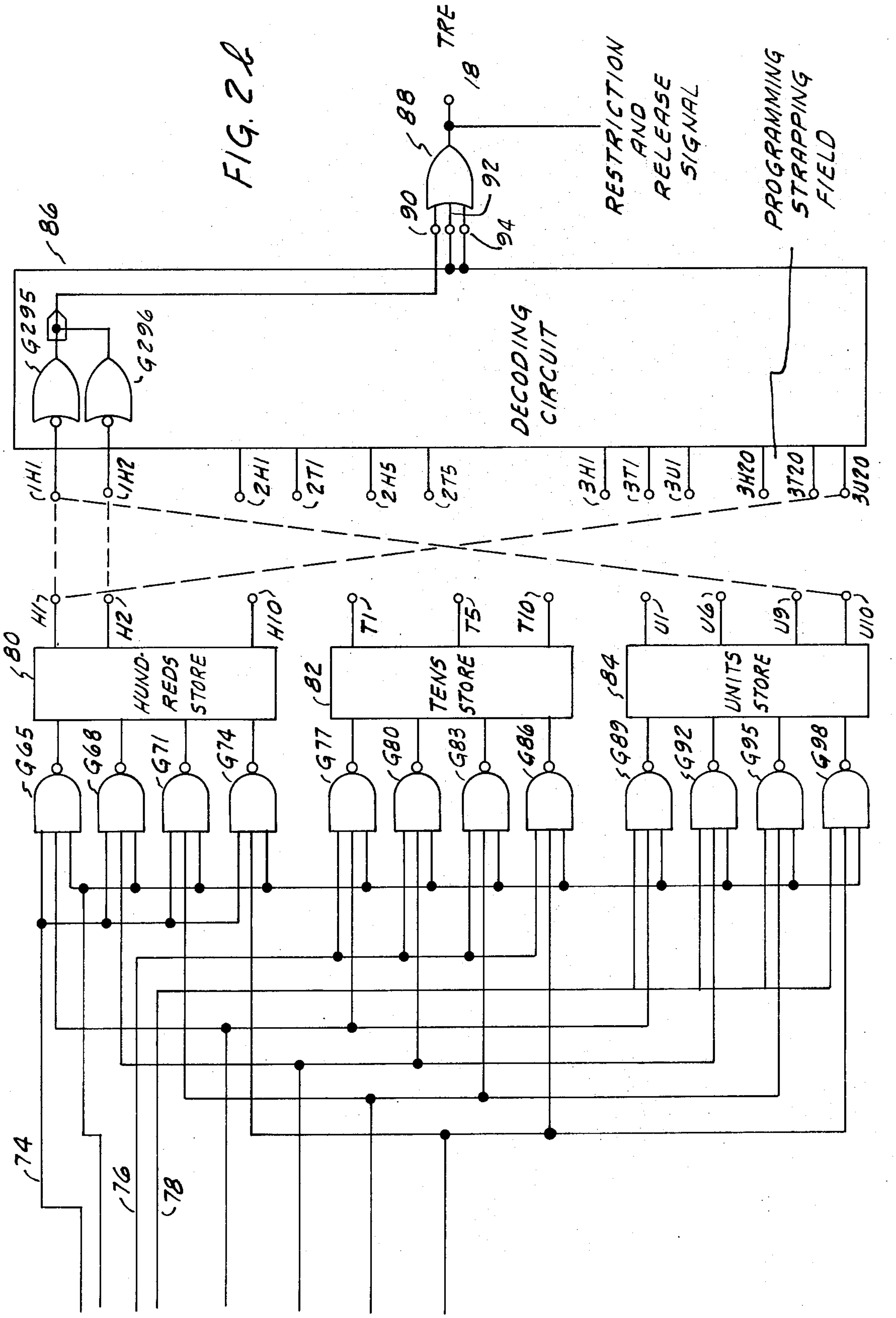

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram showing the use of the invention in an electronic switching system, FIGS. 2*a* and 2*b* together form a block diagram illustrating an embodiment of the invention, FIG 3 is schematic drawing showing a class of service circuit of use in the practice of the invention, and FIG. 4 is a block diagram showing the manner in which FIGS. 1*a* and 1*b* should be combined.

Turn now to the block diagram of FIG. 1 to establish the setting for the present invention. In this figure, exemplary line circuits are shown at 2 and 4. When either of these line circuits, or other line circuits which are not shown, is seized by its associated extension, a connection is completed through the matrix M1 to a local junctor 6 and register 8, as indicated by dashed line 1 and line 10. In a preferred example, the matrix is a PNPN diode matrix. Attention is directed to a copending application Ser No. 139,891 of Nicola Jovic for further details concerning connections through an exemplary matrix. This application in the name of Nicola Jovic was filed on May 3, 1971, as a continuation of earlier filed application Ser. No. 7,413 (filed Feb. 6, 1970) and No. 584,140 (filed Oct. 4, 1966). These continuation applications have all been titled Multi-Stage Electronic Switching Networks, and assigned to the assignee of the present invention.

After the register 8 has been seized and the calling part has dial tone, he may dial a number internal to the EPABX which will be handled through the register 8 and the features of the present invention will not be needed. In the event that the calling party dials an access code indicating he wants to make a connection outside the EPABX, then the register 8 will terminate, the junctor 6 will be dropped out, and a second connection will be established through the matrix M1, as indicated by the dashed line 3. This latter connection is established by end marking terminal 12, as explained in the above designated Jovic application. In this way, the Trunk and Trunk Features indicated at 14 are connected to the selected line circuit. At this time, also, the Trunk Allotter 22 will be activated over line 15 to send a signal TFA over line 24. The signal TFA is approximately as long as a feature allotter pulse.

The Trunk and Trunk Features circuit at 14 include means for connecting the line circuit to the central office over a line at 16. It also connects to a line 18 over which a signal may be transmitted to the Toll Restrictor 20. The toll restrictor 20 incorporates the most important feature of the present invention and is therefore illustrated in detail in FIGS. 2*a* and 2*b* and is fully described in the text.

It will be noted from FIG. 1, also, that lines 30 are connected between the line circuits 2, 4 and a Class of Service Strapping Field at 32. This Field provides a number of connections for diodes, such as D1, which are connected between the line 30 from the line circuits and lines 34 connecting to the Toll Restrictor Class of Service Equipment at 36. Depending upon the ratio of the number of restricted callers to the number of non-restricted callers the Field may be set up so that completion of a connection through a diode means either that the call may be restricted or that it may be allowed.

TOLL RESTRICTOR

A block diagram showing the most important aspects of a toll restrictor in accordance with the present invention is shown in FIGS. 2*a* and 2*b*.

In the idle state, the TRS lead 50 is marked positive, pending receipt of a seizure signal from the trunk features circuit 14. When the trunk features circuit receives a code signal indicating that an attempt is being made to seize a trunk, a four-layer diode (not shown) in block 14 fires and the potential on the TRS lead 50 falls to approximately ground level. The ground potential at 50 energizes transistor and gate circuits in the Access Control 52 which transmits either conventional dial pulses or multi-frequency tones over 54 to an isolation and driver amplifier at 56 and to a multi-frequency receiver at 58, respectively If the pulses being received over terminal 50 are conventional dial pulses they are passed by the amplifier at 56 to 60. The amplifier 56 includes conventional filters which exclude multi-frequency signals. From 60 the pulses are routed into a four stage (flip-flop) pulse counter 62 which will provide outputs over line 41, 42, 43, 44 to gates G41, G42, G43, G44.

If, instead of dial pulses, multifrequency tones are received over terminal 50, the tones will be routed from access control 52 via 54 to a multi-frequency receiver at 58. The multi-frequency receiver is of conventional design (commonly designated by the trade name TeldTouch Receiver) having a function to convert multi-frequency tones to pulses which are read out in parallel over lines DG1, DG2 . . . DG10 to an encoder 64. The encoder 64 is a conventional decimal to binary converter formed by a plurality of gate circuits which provides binary signals over terminals 45, 46, 47, 48 to the gates G41, G42, G43, G44.

Whether the input signals at terminal 50 are dial pulses or multi-frequency tones, the outputs of the gates G41, G42, G43 and G44 are supplied to a plurality of gates G65, G68, G71 . . . G95, G98, as indicated in the figure. A gating pulse provided over 71 from either the timer 70 or the OR-gate 59 opens the gates G65–G98 permitting the contents of either the pulse counter 62 or the converter 64 to be transferred to one of the digit stores. As indicated previously, the first digit is stored in the hundreds store 80, the second in the tens store 82 and the third in the units store 84. To effect storage sequentially in the hundreds, tens and units store the sequence counter 72 provides control signals over lines 74, 76 and 78 in the correct order.

The amplifier at 56 provides a signal over 60 to an Interdigital Timer 70. The timer is of conventional form and is designed to provide a continuous signal beginning with the first pulse of each digit and terminating about 200 milliseconds after the last pulse of a digit. The timer then times-out, providing a signal to the sequence counter 72 to set it to its next setting. For example, when the trunk features are first seized, the timer 70 is started to time by a pulse. After 200 ms, the timer 70 times-out and flip-flops forming the sequence counter 72 are set by the change in voltage over 71 from 72 so that the outputs of the counter provide an activate signal over line 74 to enable the hundreds store 80 through the AND gates G65, G68, G71, G74. After each digit has been dialed and before the next digit, the timer 70 times-out and sets the next store, e.g., after the first digit (hundreds) has been dialed the tens store is set to receiver over line 76 and after the second digit (tens) has been dialed the units store is set over line 78.

The stores 80, 82 and 84 are formed by flip-flops coupled separately to the gates G65, G68 . . . G98. Flip-flops of the kind illustrated by G505 and G506 in FIG. 3 are used together with gates like G502 in a particular embodiment. When the gates are energized corresponding individual flip-flops are set. Four flip-flops in each store (i.e., in the hundreds store, tens store, units store) collectively control 10 gates to provide outputs on one terminal at a time to represent a digit. The stores 80, 82 and 84 may therefore be said to combine storage features with binary-to-decimal converters.

PROGRAM STRAPPING

Restriction of outgoing calls is completed through wired programming. To provide this programming, outputs of the hundreds, tens and units stores 80, 82 and 84 are strapped to suitable OR gates in the decoding circuit 86.

A simple one digit code can be programmed by this method by strapping between the digit store readout circuit over two selected leads among the leads H1, H2 . . . . H10 and decoding circuits formed by OR gates G295, G296. In this example leads H1 and H2 are connected to leads designated as 1H1 and 1H2. When the extension dials the digit corresponding to the programmed code, the input of the lead 1H1 or 1H2 goes to "0". When this signal appears on the input of lead 1H1, it is coupled via gates in the Readout and Release Control 88 to the restriction signal highway 18 or TRE. A restriction signal over 18 will cause termination and release of the toll restrictor.

In a similar way, two digit codes are programmed by strapping between the digit store readout circuit (leads designated H1 through H10 and T1 through T10) and the decoding circuits (leads designated 2H1 through 2H5 and 2T1 through 2T5). If the extension dials the code corresponding to the inputs of 2H1 and 2T1, outputs of gates coupled to these terminals go to "1". The signal is coupled through gates in 88 to cause termination of the call and release of the toll restrictor.

Three digit codes are programmed by strapping between the digit stores readout circuit (leads designated H1 through H10, T1 through T10 and U1 through U10) and the decoding circuits (leads designated 3H1 through 3H20, 3T1 through 3T20 and 3U1 through 3U20). As an example of programming take the code 256. In this example, lead 3H1 would be strapped to H2; lead 3T1 would be strapped to lead T5; and lead 3U1 would be strapped to lead U6. If the extension dials the code "256" the outputs of gates coupled to 3H1, 3T1 and 3U1 would go to "1". The signal "1" would be coupled via additional gate circuits to cause termination and release of the toll restrictor.

Four, five and six digit codes may be programmed by the addition of more store circuits and further decoding circuits.

The restriction and release signal is provided by OR gate 88 which responds to inputs over one or more of the lines 90, 92 and 94 to provide an indication at 18 that an attempted call is not authorized.

CLASS OF SERVICE CIRCUIT

In order to establish to what class of service a particular line circuit is entitled and to signal the trunk features whether a toll restrictor is required, special circuits are provided. These are represented by block 36 in FIG. 1. A detailed disclosure of block 36 is shown in FIG. 3.

When a subscriber dials a feature digit and the register 8 (FIG. 1) terminates, the trunk alloter 22 is activated over the line 15 by the trunk features circuit 14 causing the allotter 22 to transmit a signal TFA (over line 24) which is approximately as long as a feature allotter pulse. During the first 250 microseconds, a positive pulse is supplied over the line circuits lead 30 to operate the class of service circuit of FIG. 3 via a class of service strapping field at 32.

With the class of service, or COS, diodes D1, D2 etc. are equipped to restrict dialing, the terminal A OF FIG. 3 is strapped to terminal C. With the diode equipped, the positive pulse from the line circuit is fed through 32 to the lead TR-COS, or 34, which turns "on" a gate forming part of the amplifier circuit A500. The flip-flop G505-G506 is set via A500 and gate G502. At the same time, on lead 24 signal TFA has gone from logic 1 to logic 0 thus enabling G507. With G505 now in the "1" state, G507 goes to logic 0 causing G509 to be logic 1. This output of 36 may be designated as TRC and be routed over line 38 to Trunk and Trunk Features 14. IF the COS diode is not equipped, the flip-flop will not be set and TRC will be unchanged.

With the COS diodes D1, D2 etc. equipped to allow unrestricted dialling, the terminal B OF FIG. 3 is strapped to terminal C. With the diode equipped, the positive pulse from the line circuit is fed to the TR-COS lead 34 causing the flip-flop G505-G506 to be set via A500 and Gate G502. At the same time, lead TRFA has gone from logic 1 to logic 0 thus causing G508 to provide a "0" output for a few microseconds. This is a false signal which is absorbed in the city trunk features 14

If the calling line is not equipped with a class of service diode between the output of the line circuit and the TR-COS lead, the flip-flop G505–G506 remains set with the output of G506 at "1". The mark pulse on the TFA lead is coupled via G501, G508, G509 onto the TRC lead. The lever "1" on the TRC lead allows unrestricted dialling and the toll restrictor monitoring circuit is not connected.

At the trailing edge of the mark pulse on the TFA lead, a pulse is generated via G503 and G504. The flip-flop G505–G506 is reset preparing the circuit for the next call.

While the principles of the invention have been described above in connection with specific apparatus and applications, it is to be understood that this description is made only by way of example and not as a limitation on the scope of the invention.

We claim:

1. A toll restrictor for use with a PABX in determining whether attempts to complete trunk calls are authorized, and for providing signals for use in allowing authorized calls and for denying unauthorized calls, comprising
   first means responsive to a potential representing an access code for accessing a logic circuit,
   second means forming part of said logic circuit and responding to pulses of a first digit, routed through said first means, to provide a new ordering of pulses forming encoded signals representing said digit,
   said second means including a multi-tone receiver, a decimal-to-binary converter and gate circuits coupled to provide said encoded signals,
   storage means connected to receive and store said encoded signals,
   decoding circuits coupled to said storage means to determine whether said encoded signals represent a demand for an unauthorized call, and
   a restriction readout and release control to provide signals restricting the completion of unauthorized calls.

2. A toll restrictor as claimed in claim 1, in which
   the second means includes a pulse counter and gate circuits responsive to dial pulses to provide said encoded signals.

3. A toll restrictor as claimed in claim 1, in which
   the storage means includes gate circuits and flip-flops to accept and store said encoded signals.

4. A toll restrictor as claimed in claim 1, in which
   the decoding circuits are connected to the storage means by programming means in the form of a strapping field.

5. A toll restrictor as claimed in claim 1, in which
   the decoding circuits include a plurality of gates coupled to provide restriction information to the readout and release means.

6. A toll restrictor as claimed in claim 1, in which
   the readout and release control provides a signal to a trunk and trunk features circuit indicative of the state of authorization of a call.

7. A toll restrictor as claimed in claim 1, in which
   the toll restrictor is coupled to accept the pulses of said first digit from a trunk and trunk features circuit, and
   the toll restrictor is coupled to transmit signals indicative of the state of authorization of the call to the trunk and trunk features circuit.

8. A toll restrictor as claimed in claim 1, in which
   the toll restrictor is coupled to receive pulses from a trunk and trunk features circuit and to transmit signals concerning authorization of calls to the trunk and trunk features circuit, and
   a class of service circuit is coupled to said trunk and trunk features circuit to provide to the trunk features circuit an indication of the class of service available to a caller and to indicate whether a toll restrictor is required.

9. A toll restrictor as claimed in claim 3, in which
   a sequence counter is employed to provide timing signals to a particular portion of the storage means.

10. A toll restrictor as claimed in claim 8, in which
   a strapping field is provided,
   the class of service circuit is connected through the strapping field to individual line circuits, and
   said strapping field incorporates selected diode connections to enable the determination of the class of service to which each individual line circuit is entitled.

11. A toll restrictor for use with a PABX in determining whether attempts to complete trunk calls are authorized, and for providing signals for use in allowing authorized calls and for denying unauthorized calls, comprising
   first means responsive to a potential representing an access code for accessing a logic circuit,
   second means forming part of said logic circuit and responding to pulses of a first digit, routed through said first means, to provide a new ordering of pulses forming encoded signals representing said digit,
   storage means connected to receive and store said encoded signals,
   decoding circuits coupled to said storage means to determine whether said encoded signals represent a demand for an unauthorized call,
   a restriction readout and release control to provide signals restricting the completion of unauthorized calls,
   means for processing digits in the form of both dial pulses and multi-frequency tones,
   said means for processing digits including a pulse counter to convert dial pulses received in series to a parallel binary form, and
   said means for processing digits including a multi-frequency receiver coupled to a decimal-to-binary converter to translate multi-frequency signals into the parallel binary form.

* * * * *